Figure 1:
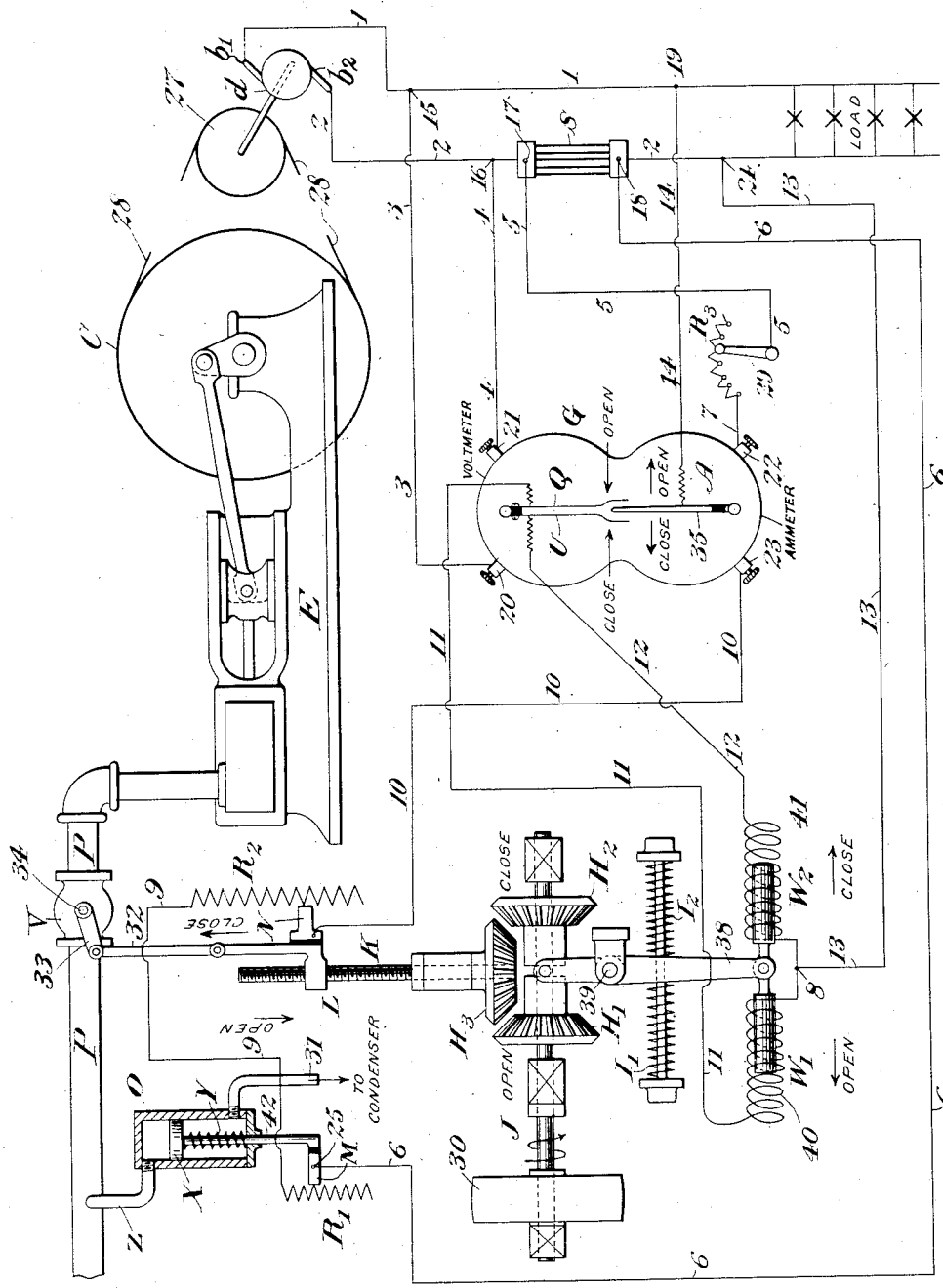

No. 832,072. PATENTED OCT. 2, 1906.
L. LYNDON.
REGULATOR FOR PRIME MOVERS.
APPLICATION FILED JUNE 26, 1905.

5 SHEETS—SHEET 1.

Witnesses:
Chas. D. King.
Benj. Aman

Inventor:
Lamar Lyndon

No. 832,072. PATENTED OCT. 2, 1906.
L. LYNDON.
REGULATOR FOR PRIME MOVERS.
APPLICATION FILED JUNE 26, 1905.

5 SHEETS—SHEET 2.

Witnesses:
Chas. D. King
Benj. Roman

Inventor:
Lamar Lyndon

No. 832,072. PATENTED OCT. 2, 1906.
L. LYNDON.
REGULATOR FOR PRIME MOVERS.
APPLICATION FILED JUNE 26, 1905.

5 SHEETS—SHEET 3.

Witnesses:
Chas. D. King
Benj. Roman

Inventor:
Lamar Lyndon

No. 832,072. PATENTED OCT. 2, 1906.
L. LYNDON.
REGULATOR FOR PRIME MOVERS.
APPLICATION FILED JUNE 26, 1905.
5 SHEETS—SHEET 4.
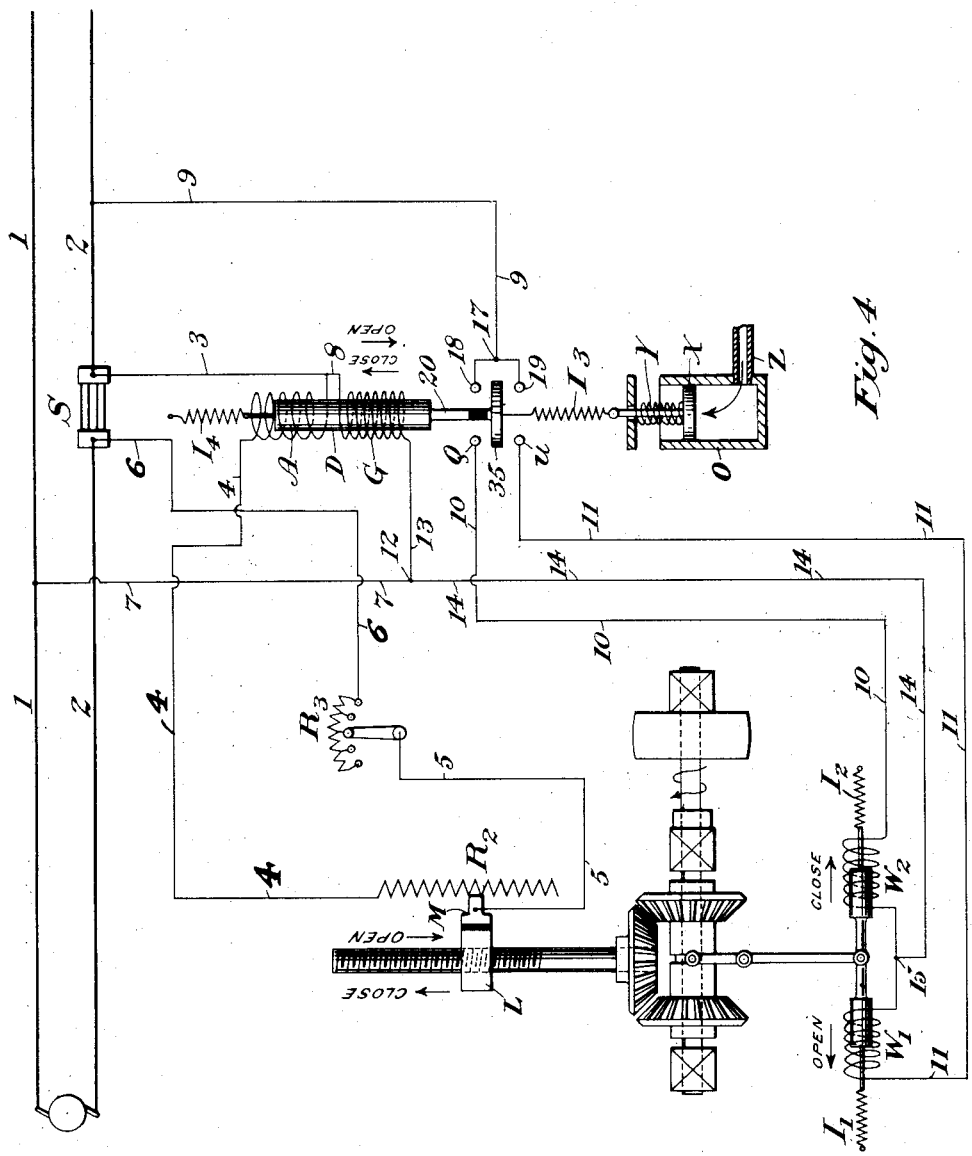

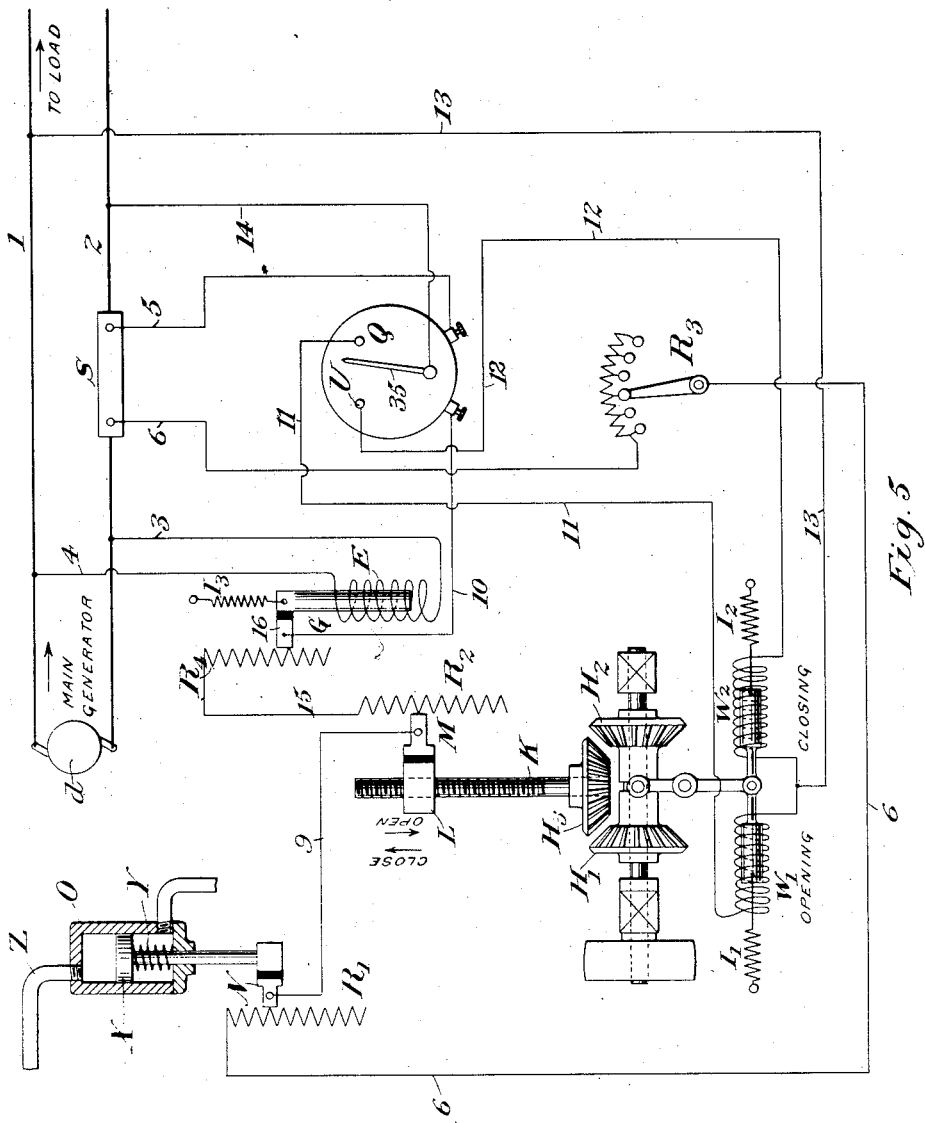

UNITED STATES PATENT OFFICE.

LAMAR LYNDON, OF EAST ORANGE, NEW JERSEY.

REGULATOR FOR PRIME MOVERS.

No. 832,072.   Specification of Letters Patent.   Patented Oct. 2, 1906.

Application filed June 26, 1905. Serial No. 266,942.

*To all whom it may concern:*

Be it known that I, LAMAR LYNDON, a citizen of the United States, and a resident of East Orange, county of Essex, State of New Jersey, have invented certain new and useful Improvements in Regulators for Prime Movers, of which the following is a specification, accompanied by drawings.

This invention relates to a system of speed control of motors driving electric generators, particularly prime movers such as steam and gas engines and water-wheels, which change their speeds with change of load unless some means be employed to vary the rate of work done by the motor proportional to load driven by it.

The object of this invention is to improve the speed regulation of such prime movers.

Another object is to prevent "racing" of prime movers and the danger attendant on abnormal speed of fly-wheels.

In all speed-governors now in use a change in speed is necessary before the regulating mechanism begins to act, and if the governor is slow or sluggish in its action this change in speed becomes marked and regulation is impaired.

The regulator herein described is designed to act and cause movement of the regulator mechanism whenever the load changes without necessitating any speed change and is, in fact, intended to prevent any speed variation whatever, even so small an amount as is now required by other forms of regulator.

Prime movers are in general provided with an inlet or admission valve, through which the working fluid is admitted to the motor and by means of which the amount of working fluid admitted may be varied to correspond to the varying requirements of the load on the motor. In the case of steam-engines this variable inlet may take the form of a valve in the steam-pipe which throttles the flow of the steam or a cut-off arrangement whereby the duration of admission of steam to the working cylinder is varied. In gas-engines the mixture of gas and air may be varied in quantity for each stroke or may be totally cut off during some of the strokes when the work to be done diminishes or the proportions of air and gas in the mixture may be varied by controlling-valves in the air or gas inlets. In water-wheels the water-inlet may be varied and the quantity of water admitted to the wheel varied, or in the case of impulse wheels the jet may be deflected, so that only a portion of it impinges on the wheel. Neglecting the case of deflection of a water-jet it is obvious that for any prime mover receiving a working fluid having a constant pressure there is a definite position of the controlling-valve or gate for any given load moved at a given speed or, stated another way, if the load on a prime mover running at a certain speed be changed and the controlling-valve of the prime mover be moved to a new position corresponding to this change in load the speed will undergo no variation if the pressure on the working fluid be maintained constant. If, however, the pressure of the working fluid varies, the position of the gate or valve corresponding to a given load is also varied, and therefore the change in the pressure of the working fluid must be compensated for.

Figure 1 shows diagrammatically the main features of my system of speed control as applied to a steam-engine. E is an engine; P, the steam-pipe leading thereto; V, a valve in the steam-pipe which controls the admission of steam to the engine. C is the drive-wheel, which is geared to dynamo $d$ by the belt 28 28, driving on the dynamo-pulley 27. $b_1$ and $b_2$ are the brushes of the dynamo connected to supply-mains 1 and 2, respectively. S is a shunt in the main 2. A is an ampere-meter connected across the shunt S, but having in its circuit the three resistances $R_1$, $R_2$, and $R_3$. G is a voltmeter having a double needle or indicator made up of the two pieces Q and U, rigidly connected together, but insulated from each other. G is connected across the mains 1 and 2. The needle of A projects into the fork made by the spreading apart of the two pieces Q U near their outer ends, as shown. These needles form, in effect, electrical contacts and are insulated from the instruments. The valve V is controlled by the movement of the screw-shaft K, which when rotated causes motion of the nut L with its yoke. The motion is communicated to the valve by means of the link 32 and arm 33. The rotation of K is produced by the meshing in of bevel-gears $H_1$ or $H_2$ with gear $H_3$. $H_1$ and $H_2$ rotate continuously, being driven by the pulley 30 on shaft J. $H_1$ and $H_2$ are free to move axially along the shaft J, but are constrained to rotate with J by means of a spline. Normally neither $H_1$ nor $H_2$ is in mesh with $H_3$. The lever 38, which is fulcrumed about pivot 39, moves the gears $H_1$ and $H_2$ to the right or left, depending on the direction of motion of the lever. $I_1$ and $I_2$ are compression-springs which hold the lever 38 in its mid-position unless moved by some force greater than that of the springs. Attached to the lever are the two solenoid-cores 40 41, surrounded by windings $W_1$ $W_2$, respectively. Obviously if $W_1$ be energized the core 40 will be drawn farther into $W_1$ and the lower end of the lever will be moved toward the left, compressing spring $I_1$ and moving $H_1$ into mesh with $H_3$. Rotation of $H_3$ will now take place and continue as long as $W_1$ is energized. If $W_2$ be energized, $H_2$ will mesh with $H_3$, and rotation of $H_3$ and shaft K take place, but the direction of rotation will be opposite to that in which $H_3$ turns when $H_1$ is meshed with it. Therefore the direction of rotation of $H_3$ depends on which of the two coils is energized. The nut L has attached to it a sliding contact N, which moves over, and coöperates with the resistance $R_2$. Manifestly the resistance $R_2$ is varied with opening and closing of the valve V, and for any given valve-opening there is a definite value for the resistance $R_2$. The resistance $R_1$ is caused to vary with the net effective pressure of the steam by means of the piston X, which moves in cylinder O. The pipe Z is connected to the steam-pipe, thereby subjecting the piston X to a pressure equal to that of the entering steam. The pipe 31 communicates with the cylinder O at the opposite end from that at which Z enters. This pipe 31 is connected to the engine-exhaust, going to the atmosphere if a non-condensing engine or to the condenser if a condensing-engine. The pressure acting on X therefore is equal to the net pressure of the entering steam. The movement of X, which the pressure tends to produce, is opposed by a spring Y. The amount of compression of the spring is proportional to the pressure on X, and therefore for any net steam-pressure there is a corresponding definite position of the piston X. Rod 42 connects the sliding contact M with piston X. This contact moves over and coöperates with resistance $R_1$, and by reason of the above-described arrangement there is a definite value of the resistance $R_1$, corresponding to a given net steam-pressure. Voltmeter G is connected across the mains 1 2 by means of wire 3, which joins main 1 at junction-point 15, and wire 4, which joins mains 2 at junction-point 16. The ammeter-circuit is from junction-point 17 on shunt S to resistance $R_3$ by wire 5, thence by wire 7 to terminal 22 through A, from terminal 23 by wire 10 to the sliding contact N through $R_2$, thence by wire 9 to resistance $R_1$ and to contact M. From M by wire 6 the circuit is completed to the opposite side of the shunt S, joining it at point 18. The shunt-circuit, therefore, has in it the ampere-meter and the three resistances $R_1$, $R_2$, and $R_3$, all in series. The insulated ammeter-needle 35 is connected to main 1 at point 19. One branch Q of the double voltmeter-needle is connected to one terminal of $W_1$ by wire 11, while the other branch U of the voltmeter-needle is connected to a terminal of $W_2$ by wire 12. The other terminals of $W_1$ and $W_2$ are joined together and the common connection joined to the main 2 by wire 13, leading from point 8 to point 24 on the main 2.

If the current through the shunt S be increased, the voltage across its terminals 17 18 will also be increased, causing a greater current-flow through the shunt-circuit. The effect of this increased current through the ampere-meter is to cause the needle 35 to swing toward the right. In doing so it will come in contact with branch Q and complete the circuit from main 1 to main 2 through the winding $W_1$. Core 40 will move to the left, compressing spring $I_1$ and meshing $H_1$ with $H_3$ and causing rotation of $H_3$ in such a direction as to move the nut L downward, thus opening the valve V and admitting more steam to the engine to drive the increased load. As L moves, N also moves downward, increasing the resistance $R_2$ in the shunt-circuit. This increase of $R_2$ decreases the current-flow through the shunt-circuit until a point is reached at which the current through the ampere-meter has been reduced to such a value that the needle 35 has returned to its normal central position. The point on the resistance $R_2$ on which N then rests corresponds in position to a position of the nut L such that the opening of the valve V admits the proper quantity of steam to the engine to drive the load. Winding $W_1$ is no longer energized, as the circuit is opened by the movement of needle 35 to its normal position. Spring $I_1$, which has been compressed, now extends and moves the gears $H_2$ $H_3$ to their normal central position and movement of $H_3$, K, L, N, and V ceases. In other words, for any load there is a corresponding drop across the shunt S and for any drop across S there is a corresponding value of $R_2$ to hold the needle 35 in its central position. Also for any value of $R_2$ there is a corresponding position of the nut L and of the valve V. Since for any load there is a corresponding position of valve-opening, it is evident that by properly proportioning the resistance $R_2$ the valve V will automatically be opened to correspond to any load on the engine. The converse of this operation follows when the load is reduced. The voltage between terminals 17 18 is decreased, and needle 35 swings to the left, touching branch U of the voltmeter-needle and completing the circuit from main 1 to main 2 through winding $W_2$. Core 41 is drawn to the right, compressing spring $I_2$ and meshing $H_2$ with $H_3$. $H_3$ and K now rotate, but in a direction opposite to that in which they turn when H is meshed with H$_3$. The movement is now to cause nut L to travel upward, closing the valve V and reducing the resistance R$_2$ in the shunt-circuit. This reduction in resistance allows a greater current to flow through the ampere-meter A, and a position of N is finally reached at which the current through the shunt-circuit is just great enough to return the needle 35 to its normal central position. This opens the circuit through W$_2$. The spring I$_2$ moves the gears H$_1$ H$_2$ to their central position and movement of the valve ceases. When this restoration of all parts to normal position takes place, N has reached a point at which the valve-opening is just great enough to drive the load at proper speed. In these operations it has been assumed that the speed, and therefore voltage, has remained constant, as the regulator acts immediately on load change without waiting for any speed change. It is possible, however, that the voltage may also change, as is the case with a shunt-wound dynamo, or the adjustment produced by the ampere-meter and resistance R$_2$ may not be exactly that required. Any change in voltage will cause the voltmeter-needles U Q to swing about needle 35 and make proper contacts to cause proper adjustment of the valve V. If, for instance, the needle 35 were in its central position and the voltage should be in excess of the normal, a reduction in speed, and therefore of valve-opening, should take place. If such a voltage increase should occur, the voltmeter-needles U Q would swing toward the right and U would contact with 35, closing the circuit through W$_2$ and energizing this winding. This would cause a movement of the regulator to close the valve V and reduce the speed. The valve movement would cease when the needles U Q return to their normal central position, which would take place when the voltage had come to its proper value. If this motion to close the valve should be considerable, the reduction in the resistance R$_2$ would allow the needle 35 to move toward the right, which would open the circuit through W$_2$ and close that through W, and thereby cause a reopening of the valve. It therefore is necessary in this particular construction to allow sufficient width of opening between the branches U Q to give a fairly good amount of "play" of the needle 35 between U and Q to take care of this condition. Other constructions will be shown, however, in which this is not necessary.

In all the foregoing has been assumed that for a definite valve-opening there would be a corresponding amount of power supplied by the engine. This is true for one steam-pressure only. Any change in pressure will change the position of valve-opening for the supply of a given amount of power. In this system the current which flows through the shunt-circuit when the proper speed is maintained is constant under all conditions and is just equal to that current which maintains the needle 35 in its central position. Obviously any change in resistance R or R$_3$ will change the value of R$_2$ necessary to maintain this value of the current for a given drop across the shunt S or, what is the same thing, will require a different position N to establish this proper current value. This means that if R$_1$ or R$_3$ be changed the amount of the valve-opening and the position of N when the needle 35 is restored to its normal position are also changed. In other words, the valve-opening corresponding to a given load has been changed. The function of resistance R$_1$ is to effect this adjustment automatically. As has been shown, R$_1$ varies with the net pressure at which the engine works. Should the pressure increase, R$_1$ increases, and R$_2$ must therefore decrease. Movement to decrease R$_2$ closes the valve. Evidently by proper adjusting the resistances of R$_1$ and R$_2$ and the range of motion of M and N any change in steam-pressure may be compensated for. The resistance R$_3$ is for the purpose of varying the speed of the engine. Any change in R$_3$ will cause a change in the current through the ampere-meter and a movement of the needle 35 to close or open the valve V, as the case may be. This resistance R$_3$ is simply a small rheostat, by means of which the speed of the unit may be adjusted either for continuous running or for short periods to parallel generators, &c. By giving resistance R$_2$ proper values from step to step the speed may be made to vary with different loads or may be maintained rigidly constant over all ranges of load, as may be desired. In running generators in parallel it is essential that the speed at full load shall be less than at no load, and this adjustment is easily accomplished in this device, as indicated above.

Figure 2:
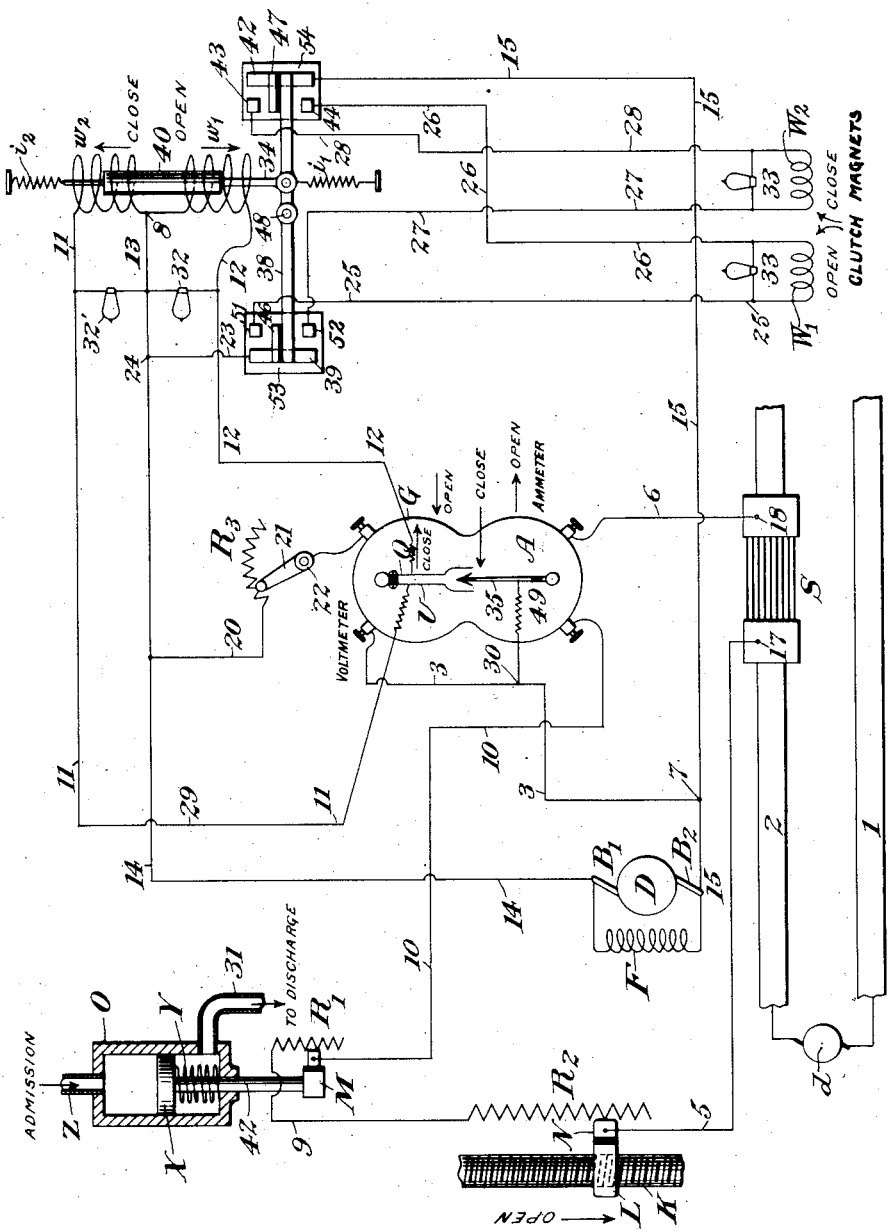

Fig. 2 shows a modification of this device as more particularly adapted to the speed control of water-wheels. $d$ is the main dynamo, connected to mains 1 and 2; S, a shunt in 2; A and G, the ampere-meter and voltmeter, respectively; R$_1$, the resistance in the shunt-circuit, which automatically changes the value with change in net pressure of the working fluid by reason of the movement of the spring-opposed piston X, as before described. R$_2$ is the resistance, which varies in value with the degree of valve or gate opening. K is the gate or valve shaft, the rotation of which in one or the other direction causes opening or closing of the gate. L is the nut, which moves with rotation of L and which has for a given head or pressure a definite position for a given load on the motor. $w_1$ and $w_2$ are windings which act on core 40, with one terminal of each joined together and to some source of current, while the other two terminals are joined to Q and U, respectively. $i_1$ and $i_2$ are springs to restore 40 to its normal position when neither $w_1$ nor $w_2$ is energized, all of which is similar to the previously-described arrangement shown in Fig. 1. In this case, however, the core 40 works a relay-switch, being connected to switch-lever 38 by rod 34 and communicating motion thereto whenever attracted by either winding. D is a small auxiliary generator, the voltage of which is dependent entirely on its speed and not on the current condition of the main dynamo. It is geared or connected to be driven at a speed rigidly proportional to that of the motor to be regulated. This auxiliary dynamo also supplies all current for operating the solenoids and the magnets that operate the device and is especially desirable when the main generator is an alternating-current machine. Also the voltage of this small machine may be made low—say thirty volts—which largely eliminates sparking at contacts and switches when the circuits are opened. The resistance $R_3$ by which the speed of the motor may be manually adjusted is in this case put in circuit with the voltmeter. $W_1$ and $W_2$ are windings of electric clutches or magnets. These magnets are similar to and correspond with the magnets $W_1$ and $W_2$ shown in Fig. 1, and they are arranged to operate the same form of mechanism shown in that figure. Referring to Fig. 1, it is obvious that the energization of $W_1$ will clutch in parts such that the resulting motion of screw K causes the valve it controls to open, while energization of $W_2$ will produce a coöperation of parts such that the valve will be closed. Other forms of mechanism operated by magnets or clutches may be substituted, the form shown in Fig. 1 and inferred therefrom from Fig. 2 not being the sole specific method of applying this invention. The relay-switch consists of the lever 38, pivoted about 48, connected, as before mentioned, to the solenoid-core 40 and working over the contacts fixed at either end on insulating-blocks 53 and 54, respectively. There are two stationary main contacts 39 and 42 mounted on the insulating-blocks 53 and 54, respectively, and connected, respectively, to the opposite brushes of the auxiliary dynamo D. 39 is connected to one brush by wire 23, which joins wire 14 at point 24, thence by wire 14 to brush $B_1$. 42 is connected by wire 15 to brush $B_2$. Fixed contact 51, mounted on block 53, and 44, mounted on block 54, are joined to the two opposite terminals of clutch $W_1$ by wires 25 and 26, respectively. Fixed contact 52 on block 53 and 43 on block 54 are connected to opposite terminals of clutch $W_2$ by wires 27 and 28, respectively. 32 and $32_1$, 33 and $33_1$ are high resistances, such as incandescent lamps, shunted across the several windings to prevent the building up of high inductive voltages when the circuits are opened. At either end of the movable lever the brushes 46 and 47 are carried. These project below the lever and are insulated from it and from each other. They bear on the left and right sets of switch-contacts, respectively. When neither $w_1$ nor $w_2$ is energized, the core 40 is held by springs $i_1$ and $i_2$ in its central position, and the lever 38 is therefore in its normal horizontal position, and brushes 46 and 47 of the switch bear only on contacts 39 and 42, and both the clutch-circuits are open. If now the core 40 be moved downward, the end of the lever to the right of the pivot 48 will be depressed, while the opposite end will be raised. Contacts 39 and 51 will be joined together, while contacts 42 and 44 will be connected together. This will connect the clutch-winding $W_1$ across the brushes of dynamo D, energizing it and causing a movement of the gate to admit more working fluid to the motor. Conversely, if core 40 be moved upward brush 47 will move upward, connecting contacts 42 and 43, while brush 46 will move downward, connecting 39 and 52. In this position clutch-winding $W_2$ is energized, and the gate is moved to reduce the amount of working fluid admitted. From this description it will be clear that amperemeter A and resistances $R_1$ and $R_2$ are traversed by current from the main generator $d$ and taken from terminals 17 18 of the shunt S, while the voltmeter G and the resistance $R_3$ are traversed by current from the auxiliary dynamo D. The windings $w_1$ and $w_2$ are energized from dynamo D, as are also the windings $W_1$ and $W_2$, though any convenient source of current-supply may be used for these. The needle 35 is connected by flexible wire 49 to wire 3 at point 30, and therefore is connected to brush $B_2$ via wires 3 and 15. The operation of this system is as follows: Assume that the speed is normal, the gate-opening being such as to correspond to that required for the existing load. Solenoid-core 40 is in its central position, as is also the relay-switch. If the load should increase, the increased drop through S will cause a greater current to flow through the shunt-circuit. Needle 35 moves toward the right, touches the branch Q of the voltmeter-needle and closes the circuit through $w_1$ from brush B to brush $B_2$ of dynamo D. Core 40 is pulled downward, extending spring $i_2$ and moving lever 38 so that brush 47 connects contacts 42 and 44 and brush 46 connects contacts 39 and 51. Magnet $W_1$ is energized and causes opening of the gate to admit a greater flow of working fluid to the motor. As this gate movement takes place the resistance $R_2$ is increased, and this movement continues until an increase in resistance sufficiently great to bring needle 35 back to its normal central position has been put in circuit. When this point has been reached, the circuit through the winding $w_1$ is opened, the spring $i_2$ pulls the core 40 back to its normal position and with it the lever 38 is restored to its horizontal position. The circuit through magnet-winding $W_1$ is thereby opened and the clutch deenergized. Motion of the valve or gate therefore ceases. Since the position to which the gate will travel depends on the change in the resistance $R_2$, it is evident that by properly proportioning this resistance the gate will always move to a position proportional to the drop across shunt S, and therefore corresponding to the load on the motor. Conversely, if the load should decrease the needle 35 will move toward the left and make contact with U, closing the circuit through $W_2$, energizing it and pulling up the core 40. This extends spring $i_1$ and moves the lever 38 to the position where contacts 42 and 43 are connected together on the right and 39 and 52 on the left. This energizes clutch $W_2$, and the gate is moved to reduce the opening. This movement will continue until the resistance $R_2$ is so reduced as to allow needle 35 to return to its neutral position, when the opening of the circuit through $w_2$ allows the spring $i_2$ to return the core 40 and the lever 38 to their neutral positions. The circuit through clutch-winding $W_2$ is thereby opened and motion of the gate ceases, stopping at the point corresponding to the opening required to admit the proper amount of working fluid to the motor to drive the reduced load. Where the current through the clutch-windings is considerable, it is better to use a relay and avoid breaking heavy currents on the needle-contacts. The auxiliary generator D is preferably a laminated field shunt-wound machine, the voltage of which changes much more rapidly than the speed. Since the voltage of this machine is affected only by speed change, the voltmeter-needles U Q will always retain their central positions if the speed remains constant regardless of voltage fluctuations in the main circuit which may be set up by changes in excitation, output, &c.

Figure 3:
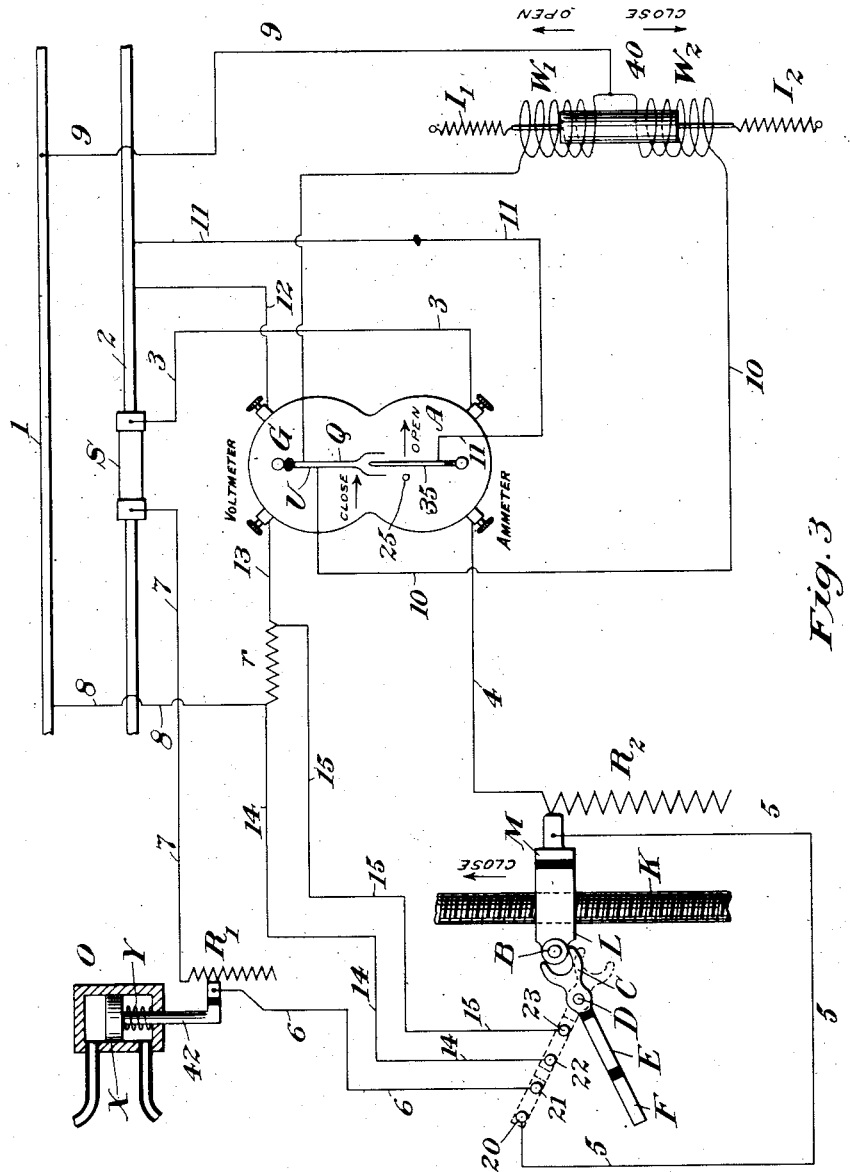

The extent of gate or valve movement is modified by any change in pressure of the working fluid, which changes also $R_1$, as before described. The hand-regulator $R_3$ by changing the resistance of the voltmeter-circuit and the current passing through it changes the position of the voltmeter-needle U Q, and therefore produces a movement of the gate. Since the needles 35 and U Q may swing together through a wide range, a new position of the voltmeter-needle will require a new position of the ampere-meter needle as the normal or central, which means that the gate-opening for a given load is changed by changing the position of the voltmeter-needle, which in turn changes the speed at which the motor will operate. The usefulness of a manual method of varying and adjusting the speed of prime movers has before been pointed out. This method of control is satisfactorily operative from twelve per cent. of full load to full or overloads; but below ten or twelve per cent. of normal load the current through the ampere-meter circuit is too low to keep the needle 35 in its normal mid-position. Therefore an additional device is required, as shown in Fig. 3. The mains 1 2, with shunt S, the voltmeter G, with the double needle U Q, the ampere-meter A, with needle 35, the moving nut L, working on screw-shaft K and carrying with it the contact M, coöperating with the resistance $R_2$, the resistance $R_1$, controlled by the pressure in cylinder O, counterbalanced by spring Y, the solenoid-windings $W_1$ $W_2$, coöperating with core 40, and the returning-springs $I_1$ $I_2$ are all as have been before fully set forth. The circuits and connections are also essentially identical with the previously-described cases, except that a resistance $r$ is included in the voltmeter-circuit, a switch in the ampere-meter circuit, and a short-circuiting switch for cutting the resistance $r$ out of the voltmeter-circuit. Also a peg 25 is provided on the face of the ampere-meter, limiting the motion of needle 35 when the current through the instrument falls below the amount required to maintain the needle in its normal position, all the resistance $R_2$ being cut out of circuit. On the nut L is the stop-roller B, which engages in the jaw C of the switch F E, pivoted about D. F and E are insulated from each other. When in the position shown by dotted lines, F joins contacts 20 and 21 together and E joins contacts 22 and 23 together. The contacts are all open-circuited when in the position shown by full lines. When contacts 20 and 21 are joined, the circuit through the ampere-meter $R_1$ and $R_2$ is completed. The connecting of 22 and 23 short-circuits resistance $r$. The operation of this device is as follows: When the load exceeds ten or twelve per cent. of normal, nut N is in a position downward past switch F E and works to and fro without moving this switch, which is in the position shown by the dotted lines, the ampere-meter circuit being closed and the resistance $r$ short-circuited. The connections and operation are exactly as has been set forth in the description of Figs. 1 and 2. As the load falls off, the nut L approaches the switch until it reaches the point shown by the full lines, which is about ten per cent. of gate or valve opening, at which it throws open switch F E and moves on past it, the jaw C being so constructed as to admit of the roller B passing by unobstructed when the switch is thrown, all the resistance $R_2$ being cut out at this point. This opens the ampere-meter circuit, and needle 35 comes back against peg 25, where it remains stationary. This movement would bring needle 35 in contact with U and cause motion to open the valve were it not for the fact that the switch in opening puts $r$ in series with the voltmeter, and therefore the double needle U Q moves backward a small amount, just enough to bring the central part of the opening between branches U and Q over the new position of ammeter-needle 35. The regulator now operates purely as a speed-controlled device, the voltmeter-needles U and Q moving in one or the other direction, according as the controlling voltage rises or falls, due to changes in speed. Since contact between 35 and U or Q causes motion of the gate or valve controlling the admission of working fluid to the motor, a fairly satisfactory degree of regulation—about such as is attained in the best fly-ball-governed regulators—is attained on these light loads. As the load increases and the gates are opened more and more the nut L finally passes the point where it brings B in contact with the switch-jaw C and throws the switch over, and normal operation is resumed, as before.

This system is capable of being widely varied in its actual construction. For instance, Fig. 4 shows one method of accomplishing the same results as the before-described apparatus. A differentially-wound solenoid made up of core D and windings A and G operates a switch to close the proper clutch-windings. Winding A is in a circuit from the terminals of a shunt S in the main 2, the conductors 1 2 being the mains from the generator, which latter is driven by the motor which is to be regulated. In this same circuit are also the resistance $R_2$, which varies with the position of the gate or valve through which the working fluid passes, and $R_3$, the hand-manipulated resistance. G is a shunt-winding taken from any suitable source of electric current, which varies its electromotive force with change in speed of the prime mover. The two windings are opposed to each other, G being the stronger. Core D is held in position by spring $I_4$ pulling upward and $I_3$, which is stronger, pulling downward. If the ampere-turns due to G remain constant and those of A increase, due to increase in load, the total magnetization is reduced and spring $I_3$ overcomes both the magnetic pull and the pull of spring $I_4$ and pulls down the core D This lowers the conducting cross-bar 35, which makes contact with points U and 19 This completes the circuit through magnet or clutch winding W; and causes movement to open the controlling gate or valve. As this movement takes place nut M travels downward, increasing the resistance $R_2$ and reducing the current strength through the shunt-circuit until the ampere-turns of A are brought back to their normal value, at which point the core D is returned to its central position by the increased magnetic pull, assisted by the spring $I_4$. This opens the circuit through W, the clutch-magnet $W_1$ releases, and movement of the gate stops. The converse of this operation results from a decrease in load and a corresponding diminution of the ampere-turns of A, which increases the magnetic pull on core D. This increased pull, assisted by spring $I_4$, overcomes spring $I_3$ and lifts the core, moving conducting-bar 35 upward and connecting together contacts Q and 18. This energizes the clutch-winding $W_2$ and causes a closing of the admission valve or gate. The resistance $R_2$ is decreased by this motion until the current through A is restored to normal. This reduces the magnetic pull on the core D, and it returns to its normal position, opening the circuit through $W_2$, and thereby stopping further movement of the gate or valve. If there is any marked change in speed, the change in the voltage will vary the ampere-turns of winding G, which will result in a movement of the core and a corresponding movement of the switch-bar 35 to move the admission-valve to further opened or closed, as the case may be. Thus an increase in speed and in voltage will cause a stronger upward pull on core D, owing to the increase in the ampere-turns of G, and the core D moving upward connects by bar 35 contacts Q and 18, which energizes $W_2$ and causes closing of the gate or valve. The converse operation is obvious from the before-given descriptions. The compensating spring-opposed piston X working in cylinder O and varying its position with change in pressure of the working fluid which is admitted to the cylinder through pipe Z may be made to work a contact, coöperating with a resistance in the shunt-circuit, as has been described. In this case, however, it varies the tension on the spring $I_3$ by changing its position, and thereby changes the number of net effective ampere-turns required to keep the core in its normal central position. This means, of course, that the current through A for equilibrium of spring and magnetic pulls is changed, and therefore the position of the gate or valve for a given load on the main generator is changed. Thus an increase in pressure of the working fluid requires a smaller gate-opening for a given load. This increase in pressure moves piston X upward against the pressure of spring Y. This reduces the tension on spring $I_3$. A lesser magnetizing force will now be able to move the core D upward. This is equivalent to a decrease in the ampere-turns of G or an increase in the ampere-turns of A. The gate must therefore close somewhat to decrease the resistance of $R_2$ to such an amount as will allow an increased current to flow through A, so that the core will move back to its central position. For any change in load there will now be a corresponding gate or valve opening, but it will be less than it would be with lower pressure on the working fluid and on the piston X. The converse action is obvious—namely, reduction in pressure of working fluid, movement of piston X downward increasing the tension on spring I$_3$. This requires for equilibrium of core D an increased magnetic pull, which is attained by reducing the opposing ampere-turns of A. Before this reduction is effected, the increased spring-tension of I$_3$ has pulled down core D and closed the connection through W$_2$ to open the gate. In opening the gate or valve the resistance is increased and the ampere-turns of A diminished until core D takes its position of equilibrium. All this occurs without change of load or increase of drop across shunt S, which means that with this arrangement a greater admission-gate opening for a given load results, when the pressure on the working fluid decreases.

Fig. 5 shows another possible modification of this system of control which differs from the other forms shown in that the change in voltage due to change in speed is compensated for by varying a resistance which is in the shunt-circuit, the variation in resistance being in proportion to the voltage variation. In the figure all the different parts are lettered and numbered to correspond to similar parts in the other figures, and their functions are as has been set forth. The resistance R$_4$, however, which is in the ampere-meter circuit, has contact 16 moving over and coöperating with it. This contact is fastened to, but insulated from, core E, which is attracted downward by the winding G. This magnetic pull is opposed by spring I$_3$. Evidently any increase in the voltage of mains 1 2 or whatever the source of current-supply is used to excite G will result in an increase in pull of core E and a downward motion of the core and contact 16, further extending spring I$_3$ and increasing the resistance R$_4$. Since any increase in resistance of the shunt-circuit will result in a movement of the ampere-meter hand 35 to the left, closing contacts which set in motion the mechanism to close the gate or admission-valve, it is evident that the action of the potential-solenoid and R$_4$ is to reduce the gate-opening with increase in voltage. Manifestly the converse of this is true. A reduction in voltage will reduce the magnetic pull of G on E, spring I$_3$ will draw up the core, and with it the contact 16, decreasing the resistance R$_4$ and causing thereby movement of ampere-meter needle 35 to the right. This then makes contact with peg Q, which results in a movement of the valve-operating mechanism to open the gate.

There are many possible variations of this system of regulation that will readily suggest themselves to those skilled in the art, and it is also obvious that some portions may be used without the others.

Without enumerating variations or equivalents, I claim as my invention—

1. In an electric speed-regulator, the combination of a prime mover receiving a working fluid, a dynamo-electric machine driven by the prime mover, and means whereby the admission of working fluid to the prime mover is regulated, responsive to changes in speed of and load on prime mover and pressure of working fluid.

2. In a speed-regulator the combination of a prime mover, driving a dynamo-electric machine, a working fluid for the prime mover subject to changes in pressure, and means whereby the admission of working fluid to the prime mover is varied responsive to changes in pressure of the working fluid, and the load on the dynamo-electric machine and the speed of the prime mover.

3. In an electric speed-regulator the combination of a prime mover receiving a working fluid, a dynamo-electric machine driven from the prime mover, electroresponsive means electrically connected to said dynamo-electric machine, whereby the admission of working fluid to the prime mover, is varied responsively both to the variation in load on said dynamo-electric machine and the variation in the energy in a unit volume of the working fluid.

4. In an electric speed-regulator the combination of a prime mover receiving a working fluid, a dynamo-electric machine driven from the prime mover, and electroresponsive means electrically connected to said dynamo-electric machine, whereby the admission of working fluid to the prime mover is varied responsively both to the variation in load on said dynamo-electric machine and the variation in pressure on the entering working fluid.

5. An electric regulator comprising an electroresponsive device connected to a dynamo-electric machine whose prime mover is to be regulated, said device changing its position responsively to change in output of said dynamo-electric machine, and having a neutral position corresponding to proper balance between the load on said prime mover and the amount of working fluid admitted thereto, means whereby the said electroresponsive device varies the quantity of working fluid admitted to the prime mover responsively both to change in load on said generator, and change in pressure of entering working fluid, and means for returning the electroresponsive device to its neutral position when balance between load and quantity of working fluid has been restored.

6. In an electric regulator the combination of an electric generator driven by a motor receiving a working fluid and electrical means for maintaining a ratio between the generator output and the admission of the working fluid, such that the speed of the prime mover is maintained substantially constant, said means being responsive to changes both in generator output and pressure of the working substance.

7. In an electric speed-regulator the combination of electric generator driven by a prime mover receiving a working fluid, an electroresponsive device controlling admission of working fluid to the prime mover, said device having a neutral position corresponding to balance between the amount of working fluid admitted to said prime mover and the generator output, and means whereby the electroresponsive device is displaced from the neutral position when said balance is destroyed and returns to said position when the balance is restored, said restoring means comprising a variable resistance connected to the electroresponsive device, which resistance changes responsively both to motion of the admission-changing mechanism and the pressure of the working fluid.

8. In an electrical regulator the combination of an electric generator driven by a prime mover receiving a working fluid, devices to vary admission of the working fluid, which devices are responsive to changes in an electroresponsive device connected to a circuit from said generator and having in series connection therewith resistances which are varied both by the position of the admission-varying devices and the pressure of the working fluid.

9. In an electric regulator the combination of an electric generator driven by a prime mover receiving a working fluid, a device which varies its position with variation in the speed of the prime mover, an electroresponsive device which varies its position responsive to the generator-current, resistance which is connected to the second device and which is varied responsive, both to the change in the admission of working fluid and to change in pressure of the working fluid, and means controlled by the resistance and said devices coacting with each other, to vary the admission of the working fluid responsively to the load on the prime mover.

10. In an electric speed-regulator the combination of an electric generator driven by a prime mover receiving a working fluid, a plurality of electroresponsive devices having their action controlled respectively by the current output of the generator and voltage of a source which varies in value with variation in speed of the prime mover, a plurality of variable resistances, controlled by the degree of opening of the admission-valve of the prime mover, the pressure of the working fluid, and manually, respectively, changes in one of which resistances vary the action of one of the electroresponsive devices, and means controlled by said electroresponsive devices to vary the admission of working fluid responsive to variations in load on the prime mover.

11. In an electric speed-regulator, the combination of an electric generator driven by a motor receiving a working fluid, a plurality of electroresponsive devices having their action controlled respectively by the current output of the generator, and the voltage of a source which varies with the speed of the prime mover, a plurality of variable resistances electrically connected with the electroresponsive devices controlled respectively by the opening of the admission-valve of the prime mover, and manually, changes in which resistances vary the action of the electroresponsive devices, means controlled by said electroresponsive devices to vary the admission of working fluid responsive to variation in position of either electroresponsive device and means responsive to variation in the pressure of the working fluid which coöperate with the said electroresponsive means to vary the admission of the working fluid inversely as the pressure thereof.

12. In an electric speed-regulator, the combination of an electric generator driven by a prime mover receiving a working fluid, being controlled by either of two electrical devices whereof one is responsive to changes in the generator-current, the other responsive to changes in voltage of any generator driven by the prime mover, a variable resistance controlled by movement of the controller mechanism for maintaining substantially constant the pull of one electroresponsive device, a second variable resistance controlled manually for varying the pull of one of the electroresponsive devices at will, and means responsive to pressure of the working fluid for varying the action of one of said electroresponsive devices with variation in pressure of the working fluid.

13. In an electric regulator, the combination of electrical means responsive to current changes in a generator driven by a prime mover, electrical means responsive to changes in voltage of a generator also driven by said prime mover, a variable resistance electrically connected with one of said electroresponsive means, varied with variation in admission of working fluid to the prime mover, and means responsive to variation in pressure of the working fluid, all coacting to control a mechanism which varies the admission of working fluid to the prime mover responsively to variation in any of these several elements.

14. In an electric regulator the combination of an electrical means responsive to current changes from a generator driven by a prime mover, electrical means, responsive to changes in voltage of a generator driven by said prime mover, a variable resistance electrically connected with one of said electro-responsive means, varied with variation in admission of working fluid to the prime mover, a pressure device responsive to variations in pressure of the working fluid, with circuits and connections whereby all these elements coact to control a mechanism which varies the admission of working fluid to the prime mover, with variation of load driven thereby, and with variation of the pressure of the working fluid.

In testimony whereof I have signed my name in the presence of two subscribing witnesses.

LAMAR LYNDON.

Witnesses:
 JNO. S. S. FULTON,
 ALICE INEZ CRAIG.